US010174413B2

(12) United States Patent
Yamanaka et al.

(10) Patent No.: US 10,174,413 B2
(45) Date of Patent: Jan. 8, 2019

(54) AL-BASED ALLOY PLATED STEEL MATERIAL HAVING EXCELLENT POST-COATING CORROSION RESISTANCE

(71) Applicant: NIPPON STEEL & SUMITOMO METAL CORPORATION, Tokyo (JP)

(72) Inventors: Shintaro Yamanaka, Tokyo (JP); Jun Maki, Tokyo (JP); Masao Kurosaki, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 362 days.

(21) Appl. No.: 14/783,316

(22) PCT Filed: Apr. 17, 2014

(86) PCT No.: PCT/JP2014/060910
§ 371 (c)(1),
(2) Date: Oct. 8, 2015

(87) PCT Pub. No.: WO2014/181653
PCT Pub. Date: Nov. 13, 2014

(65) Prior Publication Data
US 2016/0068942 A1  Mar. 10, 2016

(30) Foreign Application Priority Data
May 7, 2013 (JP) .................... 2013-097550

(51) Int. Cl.
B32B 15/01 (2006.01)
C23C 10/30 (2006.01)
C23C 2/12 (2006.01)
C22C 21/00 (2006.01)
C23C 28/00 (2006.01)
C23C 2/28 (2006.01)

(52) U.S. Cl.
CPC ............. *C23C 10/30* (2013.01); *B32B 15/01* (2013.01); *C22C 21/00* (2013.01); *C23C 2/12* (2013.01); *C23C 2/28* (2013.01); *C23C 28/321* (2013.01); *C23C 28/345* (2013.01)

(58) Field of Classification Search
None
See application file for complete search history.

(56) References Cited

U.S. PATENT DOCUMENTS 8,986,849 B2 * 3/2015 Maki .................. C21D 1/673
428/457
8,992,704 B2 3/2015 Maki et al.
2011/0030441 A1 * 2/2011 Maki ..................... C23C 2/12
72/342.8
2011/0060441 A1 * 3/2011 Ko ..................... G05B 17/02
700/101
2011/0174418 A1 7/2011 Maki et al.
2012/0073351 A1 3/2012 Maki et al.
2015/0044499 A1 2/2015 Maki et al.

FOREIGN PATENT DOCUMENTS

| CN | 102066615 A | 5/2011 |
|---|---|---|
| CN | 102089451 B | 3/2013 |
| JP | 56-41364 A | 4/1981 |
| JP | 60-47347 B2 | 10/1985 |
| JP | 2003-34845 A | 2/2003 |
| JP | 2007-302982 A | 11/2007 |
| JP | 2009-263692 A | 11/2009 |
| JP | 2011-149084 A | 8/2011 |
| JP | 2012-92365 A | 5/2012 |
| JP | 2013-221202 A | 10/2013 |
| JP | 2013-227620 A | 11/2013 |
| KR | 10-2010-0121705 A | 11/2010 |
| WO | WO 02/103073 A2 | 12/2002 |
| WO | WO 2009/131233 A1 | 10/2009 |

OTHER PUBLICATIONS

International Search Report, issued in PCT/JP2014/060910, dated Jul. 15, 2014.
Office Action of Taiwanese Patent Application No. 103114502, dated May 27, 2015.
Written Opinion of the International Searching Authority, issued in PCT/JP2014/060910, dated Jul. 15, 2014.
Japanese Office Action for Japanese Application No. 2015-515830, dated Aug. 2, 2016.
English translation of the International Preliminary Report on Patentability and Written Opinion of the International Searching Authority (Forms PCT/IB/338, PCT/IB/373 and PCT/ISA/237), dated Nov. 19, 2015, for International Application No. PCT/JP2014/060910.
Korean Office Action dated Sep. 13, 2016, for Korean Application No. 10-2015-7030978.

* cited by examiner

Primary Examiner — Daniel J. Schleis
(74) Attorney, Agent, or Firm — Birch, Stewart, Kolasch & Birch, LLP

(57) ABSTRACT

An Al-based alloy plated steel material includes: a steel material and a coating layer formed on a surface of the steel material, wherein the coating layer includes an Al-based alloy plating layer containing, in mass %, not less than 10% nor more than 50% Fe and not less than 3% nor more than 15% Si, and formed on the surface of the steel material; a layer containing ZnO and formed above a surface of the Al alloy plating layer; and a $ZnAl_2O_4$ layer with a thickness of not less than 0.05 μm nor more than 2 μm, formed between the Al alloy plating layer and the layer containing ZnO.

2 Claims, No Drawings

AL-BASED ALLOY PLATED STEEL MATERIAL HAVING EXCELLENT POST-COATING CORROSION RESISTANCE

TECHNICAL FIELD

The present invention relates to an Al-based alloy plated steel material having excellent post-coating corrosion resistance.

BACKGROUND ART

Various kinds of rustproof materials are widely used in various fields in order to reduce an environmental load, cut down life-cycle cost, and further ensure safety. Their use examples include small components such as electronic components, home electric appliances, automobiles, construction materials, and further large structures such as infrastructure facilities.

A plated steel material is one of the rustproof materials, and especially a Zn-plated steel material is often used. Main reasons why the Zn-plated steel material is often used are that it is relatively low-priced and has a sacrificial anticorrosive action on a base iron, and that a corrosion rate of Zn itself in an atmospheric environment is low. Examples of a plated steel material other than the Zn-plated steel material include an Al-plated steel material. However, the Al-plated steel material has problems that it does not have a sacrificial anticorrosive action on a base iron due to an oxide coating film existing on a surface of its Al plating layer, and that it is poor in post-coating corrosion resistance since its chemical conversion treatability is insufficient due to the oxide coating film existing on the surface of the Al plating layer. On the other hand, since Al itself is lower in corrosion rate than Zn, it is thought that the application range widens if sacrificial corrosion resistance and post-coating corrosion resistance can be ensured in the Al plating layer.

Therefore, arts for improving corrosion resistance of an Al plating layer have been proposed. For example, Japanese Laid-open Patent Publication No. 2003-34845 (Patent Literature 1) discusses that, by making 0.5 to 10% Mg contained in Al plating, a sufficient amount of a chemically converted coating film is generated, so that post-coating corrosion resistance improves. However, adding an active element such as Mg to the Al plating increases activity of the Al plating layer itself, so that bare corrosion resistance (corrosion resistance in an uncoated state) deteriorates on the contrary.

Further, Japanese Laid-open Patent Publication No. 2007-302982 (Patent Literature 2) describes that applying Zn, a compound of Zn, or the like on a surface of an Al plating layer improves post-coating corrosion resistance. However, an effect of improving post-coating corrosion resistance is still insufficient since adhesion of Zn or the Zn compound to plating is not sufficient.

CITATION LIST

Patent Literature

Patent Literature 1: Japanese Laid-open Patent Publication No. 2003-34845

Patent Literature 2: Japanese Laid-open Patent Publication No. 2007-302982

SUMMARY OF INVENTION

Technical Problem

In consideration of the aforesaid problems, it is an object of the present invention to provide an Al-based alloy plated steel material having sacrificial corrosion resistance and more excellent in post-coating corrosion resistance than conventional Al-plated steel materials.

Solution to Problem

As a result of studious studies for overcoming the aforesaid problems, the present inventors have found out that it is possible to realize an Al-based alloy plated steel material having a sacrificial anticorrosive effect and being more excellent in post-coating corrosion resistance than conventional Al-based plated steel materials, by providing a layer containing ZnO on a surface of an Al-based alloy plating layer, making Fe and Si contained in the Al-based alloy plating layer, and further forming a composite oxide layer including Zn and Al between the layer containing ZnO and the Al-based alloy plating layer. The gist of the present invention is as follows.

(1) An Al-based alloy plated steel material having excellent post-coating corrosion resistance, the Al-based alloy plated steel material including: a steel material and a coating layer formed on a surface of the steel material, wherein the coating layer contains, in mass %, not less than 10% nor more than 50% Fe and not less than 3% nor more than 15% Si, and includes:

an Al-based alloy plating layer formed on the surface of the steel material;

a layer containing ZnO and formed above a surface of the Al alloy plating layer; and a $ZnAl_2O_4$ layer with a thickness of not less than 0.05 μm nor more than 2 μm, formed between the Al alloy plating layer and the layer containing ZnO.

(2) The Al-based alloy plated steel material having excellent post-coating corrosion resistance according to claim 1, wherein a surface roughness Ra of the coating layer is within a range of not less than 1 μm nor more than 5 μm.

Advantageous Effects of Invention

As described above, according to the Al-based alloy plated steel material of the present invention, it has sacrificial corrosion resistance, and its post-coating corrosion resistance can be far more improved than that of conventional Al-plated steel materials. Accordingly, it is applicable to home electric appliances, automobiles, construction materials, and further large structures such as infrastructure facilities, and thus its industrial contribution is very large.

DESCRIPTION OF EMBODIMENTS

Hereinafter, an embodiment of the present invention will be described in detail. An Al-based alloy plated steel material of this embodiment includes a steel material and a coating layer formed on a surface of the steel material. The coating layer includes: an Al-based alloy plating layer formed on the surface of the steel material; a layer containing ZnO and formed above a surface of the Al-based alloy plating layer; and a $ZnAl_2O_4$ layer formed between the Al-based alloy plating layer and the layer containing ZnO.

In the description of the embodiment and examples, the layer containing ZnO is referred to as a "ZnO-containing layer").

The Al-based alloy plating layer needs to contain Fe. Fe has an effect of imparting sacrificial corrosion resistance to the Al-based alloy plating layer itself and an effect of increasing a surface roughness of the Al-based alloy plating layer to exhibit an anchoring effect, thereby improving post-coating corrosion resistance. The content of Fe in the Al-based alloy plating layer needs to be not less than 10% nor more than 50% in mass %. When the content of Fe is less than 10%, the effect of imparting sacrificial corrosion resistance and the effect of increasing the surface roughness of the Al-based alloy plating layer are weak, which is not preferable. Further, when the content of Fe is over 50%, the Al-based alloy plating layer itself becomes brittle and becomes poor in plating adhesion, which is not preferable.

Further, in view of more improving plating adhesion, the Al-based alloy plating layer needs to contain Si within a range of not less than 3% nor more than 15% in mass %, in addition to Fe. By making Si contained in the Al-based alloy plating layer, it is possible to suppress the growth of a Fe—Al alloy layer to improve plating adhesion. Incidentally, when the content of Si is less than 3%, this effect becomes weak, and when the content is over 15%, plating adhesion deteriorates on the contrary.

Further, the surface roughness Ra of the Al-based alloy plating layer is preferably not less than 1 μm nor more than 5 μm. The surface roughness Ra is a surface shape parameter defined by JIS B 0601. When the surface roughness Ra is less than 1 μm, post-coating corrosion resistance becomes poor due to an insufficient anchoring effect. When the surface roughness Ra is over 5 μm, irregularities become too great, which is a cause to generate a variation in film thickness, leading to deterioration in corrosion resistance on the contrary. Incidentally, in the Al-based alloy plated steel material of this embodiment, the surface roughness Ra of the Al-based alloy plating layer is reflected in a surface roughness of the coating layer. Therefore, the surface roughness Ra of the coating layer falls within the range of not less than 1 μm nor more than 5 μm.

Further, the coating layer needs to have the $ZnAl_2O_4$ layer immediately on the Al-based alloy plating layer, that is, between the ZnO-containing layer and the Al-based alloy plating layer. The $ZnAl_2O_4$ layer has an effect of strengthening adhesion of the Al-based alloy plating layer and the steel material to the ZnO-containing layer to improve post-coating corrosion resistance. The $ZnAl_2O_4$ layer needs to have a thickness of not less than 0.05 μm nor more than 2 μm. When the thickness is less than 0.05 μm, the effect of increasing adhesion to improve post-coating corrosion resistance becomes weak. Further, when the thickness is over 2 μm, the $ZnAl_2O_4$ layer itself becomes brittle to easily peel off. Note that the thickness of the $ZnAl_2O_4$ layer can be measured in such a way that, after an arbitrary section of the Al-based alloy plating layer of this embodiment is cut out, it is buried in a resin and polished, and this arbitrary section is observed by a scanning electron microscope.

The Al-based alloy plated steel material needs to have the ZnO-containing layer on its uppermost surface. The ZnO-containing layer has an effect of imparting chemical conversion treatability, and also serves as a supply source of Zn for forming the $ZnAl_2O_4$ layer which is necessary for improving corrosion resistance of the Al-based alloy plated steel material of this embodiment. An amount of the ZnO-containing layer is not particularly specified, but when a Zn amount of the ZnO-containing layer is less than 0.4 g/m², it becomes difficult to form a sufficient amount of the $ZnAl_2O_4$ layer. On the other hand, when the Zn amount is over 5 g/m², the $ZnAl_2O_4$ layer becomes poor in adhesion to the Al-based alloy plating layer to come off or weldability is likely to deteriorate. Therefore, the amount of the ZnO-containing layer is preferably such an amount that the Zn amount becomes not less than 0.4 g/m² nor more than 5 g/m².

A component, a form, and so on of the steel material being a base material of the Al-based alloy plated steel material are not limited at all. The component may be a soft steel material, or may be a steel material containing a strengthening element such as Si or Mn. Further, the form may be a thin sheet, a thick sheet, a steel pipe, a section steel, or a molding.

Next, a method of manufacturing the Al-based alloy plated steel material having excellent post-coating corrosion resistance of this embodiment will be described.

The method of manufacturing the Al-based alloy plated steel material of this embodiment includes: a step of forming the Al-based alloy plating layer on the steel material; a step of forming the ZnO-containing layer on the surface of (immediately on) the Al-based alloy plating layer; and a step of forming the $ZnAl_2O_4$ layer between the Al-based alloy plating layer and the ZnO-containing layer. Hereinafter, the steps will be described.

(Step of Forming Al-Based Alloy Plating Layer)

As the method of forming the Al-based alloy plating layer, conventionally used hot dipping or the like can be employed. Further, a type of the hot dipping may be any of a redox balance process, a total oxidation process, an internal oxidation process, a flux process, a pre-plating process, and the like. In order to make Fe contained in the Al-based alloy plating layer, Fe may be mixed in advance in an Al-based alloy plating bath containing Si, or after Al-based alloy plating containing Si is applied, Fe contained in the steel material may be diffused into the Al-based alloy plating layer by heating the steel material. A deposition amount of the Al-based alloy plating layer is preferably not less than 30 g/m² nor more than 200 g/m² per surface. When the deposition amount is less than 30 g/m², corrosion resistance becomes rather poor, and when it is over 200 g/m², there is a concern about the peeling of the plating.

In order for the surface roughness Ra of the Al-based alloy plating layer to be not less than 1 μm nor more than 5 μm, the steel material on which the Al-based alloy plating layer is formed is heated up to not lower than 850° C. nor higher than 1000° C. in a region of not lower than 600° C. nor higher than 1000° C. at a heating rate of 1° C./second or more and less than 50° C./second. Alternatively, in order for the surface roughness Ra of the Al-based alloy plating layer to be not less than 1 μm nor more than 5 μm, the surface roughness Ra of the surface of the steel material on which the Al-based alloy plating layer is not yet formed may be controlled. However, the method of controlling the surface roughness Ra of the surface of the steel material involves a possibility that the surface roughness Ra of the Al-based alloy plating layer varies depending on the plating deposition amount. Therefore, the method of controlling the surface roughness Ra of the Al-based alloy plating layer by heating is preferable. As previously described, the surface roughness Ra is the surface shape parameter defined by JIS B 0601. Further, a method to measure and evaluate the surface roughness Ra is not particularly specified, and any conventionally and generally used method may be used, and for example, the method defined by JIS B 0633 may be adopted.

Further, in the heating process when the surface roughness Ra is controlled, the diffusion of Fe into the Al-based alloy plating layer may be simultaneously performed.

(Step of Forming ZnO-Containing Layer)

An example of a method of forming the ZnO-containing layer is a method in which a coating liquid is prepared by mixing a predetermined organic binder in a suspension containing ZnO, and the coating liquid is applied on the surface of the Al-based alloy plating layer. As the suspension containing ZnO, one in which a ZnO powder is dispersed in a dispersion medium such as water is preferably used. Further, examples of the predetermined organic binder are a polyurethane-based resin, a polyester-based resin, an acrylic resin, and a silane coupling agent. Further, silica may be included in organic binder components. These organic binders are preferably water-soluble so that they can be mixed with the ZnO suspension. The coating liquid thus obtained is applied on the surface of the Al-based alloy plating layer and is dried.

As another method, a method in which a ZnO powder or a powder containing a solid content such as a predetermined organic binder is applied by a powder coating method may be used.

The total content of the aforesaid organic binder components is desirably about 5 to 30% in mass ratio to ZnO. When the content of the binder components is less than 5% in mass ratio, a binder effect cannot be sufficiently obtained and accordingly the applied film is likely to peel off. In order to stably obtain the binder effect, the content of the binder components is more preferably 10% or more in mass ratio. On the other hand, when the content of the binder components is over 30% in mass ratio, smell is noticeably generated at the time of the heating, which is not preferable.

(Step of Forming $ZnAl_2O_4$ Layer)

To form the $ZnAl_2O_4$ layer between the ZnO-containing layer and the Al-based alloy plating layer, the ZnO-containing layer is first formed on the surface of the Al-based alloy plating layer. Thereafter, the resultant is heated in a range of 600° C. or lower at a heating rate of over 25° C./second and 100° C./second or less under an air atmosphere, is heated in a range of over 600° C. and 1000° C. or lower at a heating rate of 1° C./second or more and less than 50° C./second, and is subjected to heating whose ultimate temperature is within a range of not lower than 850° C. nor higher than 1000° C. That is, with 600° C. being a boundary, the heating rate is made different. Thereafter, an air cooling step or a cooling step at a rate equal to or more than that of the air cooling is performed.

Thus, with 600° C. being the boundary, the heating rate for the temperature range of 600° C. or lower and the heating rate for the temperature range of over 600° C. are made different. By such a step, ZnO reacts with Al in the Al-based alloy plating layer, so that the $ZnAl_2O_4$ layer is formed between Al in the Al-based alloy plating layer and the ZnO-containing layer. Further, according to such a step, it is possible for the formed $ZnAl_2O_4$ layer to have an aimed thickness of not less than 0.05 μm nor more than 2 μm. Incidentally, a reason why the $ZnAl_2O_4$ layer with the predetermined thickness is formed by such a step is not clear, but a possible reason is as follows. Specifically, in the range of 600° C. or lower, when the heating rate is less than 25° C./second, the Al-based alloy plating layer itself is excessively oxidized, and when the heating rate is over 100° C./second, the organic binder burns insufficiently to remain on the surface of the Al-based alloy plating layer. Consequently, the reaction with ZnO by the following heating becomes insufficient, so that the $ZnAl_2O_4$ layer is not sufficiently generated. On the other hand, in the range of over 600° C., when the heating rate is less than 1° C./second, the $ZnAl_2O_4$ layer is excessively generated and accordingly becomes brittle to easily peel off, and when the heating rate is 50° C./second or more, the $ZnAl_2O_4$ layer is not sufficiently generated, leading to poor corrosion resistance. It is thought that a reason why 600° C. is thus a point of change of the heating rate is associated with the fact that the formation of the $ZnAl_2O_4$ layer is influenced by a surface state of the Al-based alloy plating layer up to 600° C., and the formation of the $ZnAl_2O_4$ layer progresses especially when the temperature exceeds 600° C. Another possible reason is that, by changing the heating rate at 600° C., a minute crack is formed on the surface of the moderately generated Al-based alloy plating layer, so that the formation of the $ZnAl_2O_4$ is promoted. Incidentally, in this embodiment, the heating rates for the range of 600° C. or lower and for the range of over 600° C. and 1000° C. or lower both include the range over 25° C./second and less than 50° C./second. However, even when the heating is performed at a heating rate within this overlapping range, the heating rate for the range of 600° C. or lower and the heating rate for the range of over 600° C. and 1000° C. or lower are made different. In this case, the heating rate for the range of over 600° C. and 1000° C. or lower is preferably lower than the heating rate for the range of 600° C. or lower. Further, this heating process may also serve as the heating process for controlling the surface roughness Ra of the Al-based alloy plating layer and the heating process for diffusing Fe into the Al-based alloy plating layer.

Incidentally, the Al-based alloy plating layer is preferably oxidized by heating in the atmosphere before the ZnO-containing layer is formed. As such a heating process, a process of heating the Al-based alloy plating layer at 300 to 600° C. for 30 seconds to 10 minutes under an air atmosphere can be employed, for instance. By performing such a heating process, a sufficient amount of an $Al_2O_3$ coating film is formed on the surface of the Al-based alloy plating layer, so that a reaction of the $Al_2O_3$ layer+the ZnO-containing layer→$ZnAl_2O_4$ more easily progresses. This heating process may also serve as the heating process for controlling the surface roughness Ra of the Al-based alloy plating layer and the heating process for diffusing Fe into the Al-based alloy plating layer.

As described hitherto, according to the Al-based alloy plated steel material of this embodiment, its post-coating corrosion resistance can be far more improved than that of conventional Al-plated steel materials, owing to the sacrificial anticorrosive effect of Zn. Further, owing to the presence of the $ZnAl_2O_4$ layer, workability can be enhanced.

EXAMPLES

Next, examples of the present invention will be described in detail.

First, Al-based alloy plating layers were formed on cold-rolled steel materials with a 1.2 mm sheet thickness having the components specified in Table 1 by a hot dipping method. Table 1 is a table presenting the components, other than Fe, of the cold-rolled steel materials. The hot dipping was performed on a line of a non-oxidizing furnace—reducing furnace type. Then, after plating, a plating deposition amount was adjusted to 40 g/m² per surface by a gas wiping method. Thereafter, the resultants were cooled and subjected to a zero-spangle treatment. The composition of a plating bath was set to Al-10% Si, and the temperature of the plating bath was set to 660° C.

TABLE 1

| C | Si | Mn | P | S | Ti | B | Al (mass %) |
|---|---|---|---|---|---|---|---|
| 0.22 | 0.12 | 1.25 | 0.01 | 0.005 | 0.02 | 0.003 | 0.04 |

A coating liquid in which a ZnO suspension and a binder including a urethane-based resin were mixed was applied on surfaces of the thus fabricated Al-based alloy plating layers by a roll coater, and the resultants were heated at about 80° C. to be dried. Mote that a mass ratio of the urethane-based resin to ZnO was set to 20%. An application amount of the coating liquid was set so that a Zn amount became 1.0 g/m$^2$. Thereafter, they were heated under the conditions presented in Table 2 and air-cooled in an air atmosphere, whereby Fe was diffused into the Al-based alloy plating layers and also $ZnAl_2O_4$ layers were formed between ZnO-containing layers and the Al-based alloy plating layers. Thereafter, post-coating corrosion resistance and workability were evaluated as examples of performance of Al-based alloy plated steel materials by the following methods.

(Post-Coating Corrosion Resistance)

The fabricated Al-based alloy plated steel materials were each cut into a 70×150 mm size, whereby samples were fabricated. Then, after the fabricated, samples were subjected to alkaline degreasing, they were subjected to a chemical conversion treatment by PALBOND Sx35 (manufactured by Nihon Parkerizing Co., Ltd.), following the recipe of the maker, and further a cationic electrodeposition paint (POWERNICS 110: manufactured by NIPPON PAINT Co., Ltd.) was applied with a 15 μm thickness, and they were cross-cut. Then, these samples were subjected to a 300-cycle test by the M610 method defined by Japanese Automobile Standards Organization (JASO). Post-coating corrosion resistance was evaluated based on the following criteria. 1 indicates rejection, and 2 and 3 indicate acceptance.

(Swell of Coating Film)
1: over 0.5 mm
2: 0.2 to 0.5 mm
3: less than 0.2 mm (Workability)

The fabricated Al-based alloy plated steel materials were each cut into a 30×70 mm size, and were subjected to a 90-degree bending test with a 1 mm radius of curvature. Thereafter, they were bent back, tapes were pasted on bent portions, and plating peeling widths after the tapes were peeled off were measured. Workability was evaluated based on the following criteria. 1 indicates rejection, and 2 and 3 indicate acceptance.

(Peeling Width of Plating or Coating Film)
1: over 5.0 mm
2: 2.0 to 5.0 mm
3: less than 2.0 mm The results are presented in Table 2. The results have turned out that the examples which fall within the ranges of the present invention are good both in workability and post-coating corrosion resistance, but comparative, examples which fall out of the ranges of the present invention are poor in workability or post-coating corrosion resistance.

TABLE 2

| | Al-BASED ALLOY PLATING LAYER | | | | | HEATING CONDITION AFTER PLATING | | |
|---|---|---|---|---|---|---|---|---|
| No | Fe CONCENTRATION IN PLATING (%) | Si CONCENTRATION IN PLATING (%) | PLATING BATH TEMPERATURE (° C.) | PLATING DEPOSITION AMOUNT PER SURFACE (g/m$^2$) | Ra (μm) | HEATING RATE (600° C. OR LOWER) (° C./sec.) | HEATING RATE (HIGHER THAN 600° C. AND 1000° C. OR LOWER) (° C./sec.) | HEATING TEMPERATURE (° C.) |
| 1 | <u>8</u> | 10 | 660 | 42 | 3.1 | 70 | 30 | 900 |
| 2 | 40 | <u>1</u> | 660 | 42 | 3.2 | 65 | 30 | 900 |
| 3 | <u>8</u> | <u>1</u> | 660 | 41 | 2.5 | 60 | 28 | 900 |
| 4 | 15 | 10 | 660 | 43 | 2.4 | 65 | 29 | 900 |
| 5 | 28 | 10 | 660 | 44 | 2.5 | 68 | 30 | 900 |
| 6 | 39 | 10 | 660 | 42 | 3.1 | 71 | 28 | 900 |
| 7 | 48 | 10 | 660 | 41 | 2.9 | 70 | 27 | 900 |
| 8 | <u>55</u> | 10 | 660 | 42 | 2.2 | 75 | 30 | 900 |
| 9 | 40 | <u>25</u> | 660 | 43 | 2.8 | 77 | 28 | 900 |
| 10 | <u>55</u> | <u>25</u> | 660 | 42 | 2.2 | 75 | 30 | 900 |
| 11 | 39 | 10 | 660 | 42 | 0.6 | 75 | 33 | 950 |
| 12 | 40 | 11 | 660 | 40 | 1.2 | 78 | 34 | 900 |
| 13 | 41 | 9 | 660 | 41 | 2.3 | 75 | 34 | 900 |
| 14 | 42 | 10 | 660 | 42 | 3.4 | 50 | 13 | 900 |
| 15 | 40 | 9 | 660 | 40 | 4.8 | 75 | 30 | 850 |
| 16 | 41 | 10 | 660 | 40 | 5.8 | 35 | 10 | 800 |
| 17 | 41 | 11 | 660 | 42 | 5 | <u>120</u> | 38 | <u>650</u> |
| 18 | 42 | 10 | 660 | 43 | 3.1 | 90 | 35 | 900 |
| 19 | 45 | 10 | 660 | 42 | 3.1 | 85 | 34 | 900 |
| 20 | 43 | 11 | 660 | 43 | 3.1 | 55 | 34 | 900 |
| 21 | 42 | 10 | 660 | 44 | 3.3 | 26 | 35 | 950 |
| 22 | 41 | 9 | 660 | 42 | 3.4 | 20 | 5 | <u>1200</u> |
| 23 | 43 | 10 | 660 | 15 | 0.2 | 65 | 25 | 950 |
| 24 | 43 | 10 | 660 | 35 | 1.2 | 60 | 25 | 950 |
| 25 | 39 | 11 | 660 | 60 | 3.2 | 58 | 24 | 950 |
| 26 | 42 | 10 | 660 | 190 | 3.8 | 61 | 25 | 950 |
| 27 | 41 | 9 | 660 | 250 | 4.5 | 62 | 23 | 950 |
| 28 | 43 | 10 | 660 | 41 | 3.2 | <u>10</u> | 25 | 950 |
| 29 | 45 | 10 | 660 | 42 | 3.1 | <u>120</u> | 25 | 950 |
| 30 | 44 | 10 | 660 | 42 | 3.2 | 58 | <u>0.8</u> | 950 |
| 31 | 45 | 10 | 660 | 42 | 3.1 | 61 | <u>55</u> | 950 |
| 32 | 43 | 9 | 660 | 43 | 3.3 | <u>40</u> | <u>40</u> | 950 |

TABLE 2-continued

| No | THICKNESS OF ZnAl$_2$O$_4$ (μm) | PERFORMANCE WORKABILITY | POST-COATING CORROSION RESISTANCE | NOTE |
|---|---|---|---|---|
| 1 | 0.5 | 3 | 1 | COMPARATIVE EXAMPLE |
| 2 | 0.6 | 1 | 2 | COMPARATIVE EXAMPLE |
| 3 | 0.5 | 1 | 1 | COMPARATIVE EXAMPLE |
| 4 | 0.7 | 3 | 2 | EXAMPLE |
| 5 | 0.6 | 3 | 2 | EXAMPLE |
| 6 | 0.5 | 3 | 3 | EXAMPLE |
| 7 | 0.8 | 2 | 3 | EXAMPLE |
| 8 | 0.5 | 1 | 3 | COMPARATIVE EXAMPLE |
| 9 | 0.6 | 1 | 2 | COMPARATIVE EXAMPLE |
| 10 | 0.5 | 1 | 3 | COMPARATIVE EXAMPLE |
| 11 | 0.7 | 3 | 2 | EXAMPLE |
| 12 | 0.7 | 3 | 2 | EXAMPLE |
| 13 | 0.8 | 3 | 3 | EXAMPLE |
| 14 | 1.2 | 3 | 3 | EXAMPLE |
| 15 | 0.7 | 3 | 2 | EXAMPLE |
| 16 | 1.1 | 3 | 2 | EXAMPLE |
| 17 | 0.02 | 3 | 1 | COMPARATIVE EXAMPLE |
| 18 | 0.1 | 3 | 2 | EXAMPLE |
| 19 | 0.5 | 3 | 3 | EXAMPLE |
| 20 | 1.1 | 3 | 3 | EXAMPLE |
| 21 | 1.8 | 2 | 3 | EXAMPLE |
| 22 | 2.6 | 1 | 3 | COMPARATIVE EXAMPLE |
| 23 | 0.8 | 3 | 2 | EXAMPLE |
| 24 | 0.9 | 3 | 3 | EXAMPLE |
| 25 | 0.7 | 3 | 3 | EXAMPLE |
| 26 | 0.8 | 3 | 3 | EXAMPLE |
| 27 | 0.8 | 2 | 3 | EXAMPLE |
| 28 | 0.01 | 3 | 1 | COMPARATIVE EXAMPLE |
| 29 | 0.02 | 3 | 1 | COMPARATIVE EXAMPLE |
| 30 | 3.1 | 1 | 3 | COMPARATIVE EXAMPLE |
| 31 | 0.04 | 3 | 1 | COMPARATIVE EXAMPLE |
| 32 | 0.04 | 2 | 1 | COMPARATIVE EXAMPLE |

As is seen in the comparative examples No. 30, 31, when the heating rate for higher than 600° C. and 1000° C. or lower is not within a range of 1° C./second or more and less than 50° C./second, post-coating corrosion resistance is low. Further, as is seen in the comparative examples No. 28, 29, when the heating rate for 600° C. or lower is not within a range of over 25° C./second and 100° C./second or less, post-coating corrosion resistance is low. Further, No. 32 is a result when the heating was performed without the heating rate being changed and it is poor in post-coating corrosion resistance. A possible reason for these is that a ZnAl$_2$O$_4$ layer with a thickness of not less than 0.05 μm nor more than 2 μm is not formed between the ZnO-containing layer and the Al-based alloy plating layer because the heating conditions after the plating fall out of the ranges of the present invention.

Hitherto, the preferred embodiment and the examples of the present invention have been described, but the present invention is not limited to these embodiments, and various modifications and changes can be made therein within the scope of its spirit.

INDUSTRIAL APPLICABILITY

As described above, according to the Al-based alloy plated steel material of the present invention, its post-coating corrosion resistance can be far more improved than that of conventional Al-plated steel materials, and therefore it is applicable to home electric appliances, automobiles, construction materials, and further, large structures such as infrastructure facilities, and its industrial contribution is very large.

The invention claimed is:

1. An Al-based alloy plated steel material having excellent post-coating corrosion resistance, the Al-based alloy plated steel material comprising:
    a steel material and a coating layer formed on a surface of the steel material,
    the coating layer comprising:
    an Al-based alloy plating layer;
    a ZnAl$_2$O$_4$ layer formed directly on the Al-based alloy plating layer; and
    a layer containing ZnO, formed directly on the ZnAl$_2$O$_4$ layer, and located in an uppermost surface,
    wherein the Al-based alloy plating layer contains, in mass %, not less than 10% nor more than 50% Fe and not less than 3% nor more than 15% Si, and
    wherein the ZnAl$_2$O$_4$ layer has a thickness of not less than 0.05 μm nor more than 2 μm.

2. The Al-based alloy plated steel material having excellent post-coating corrosion resistance according to claim 1, wherein a surface roughness Ra of the coating layer is within a range of not less than 1 μm nor more than 5 μm.

* * * * *